United States Patent Office 3,046,911
Patented July 31, 1962

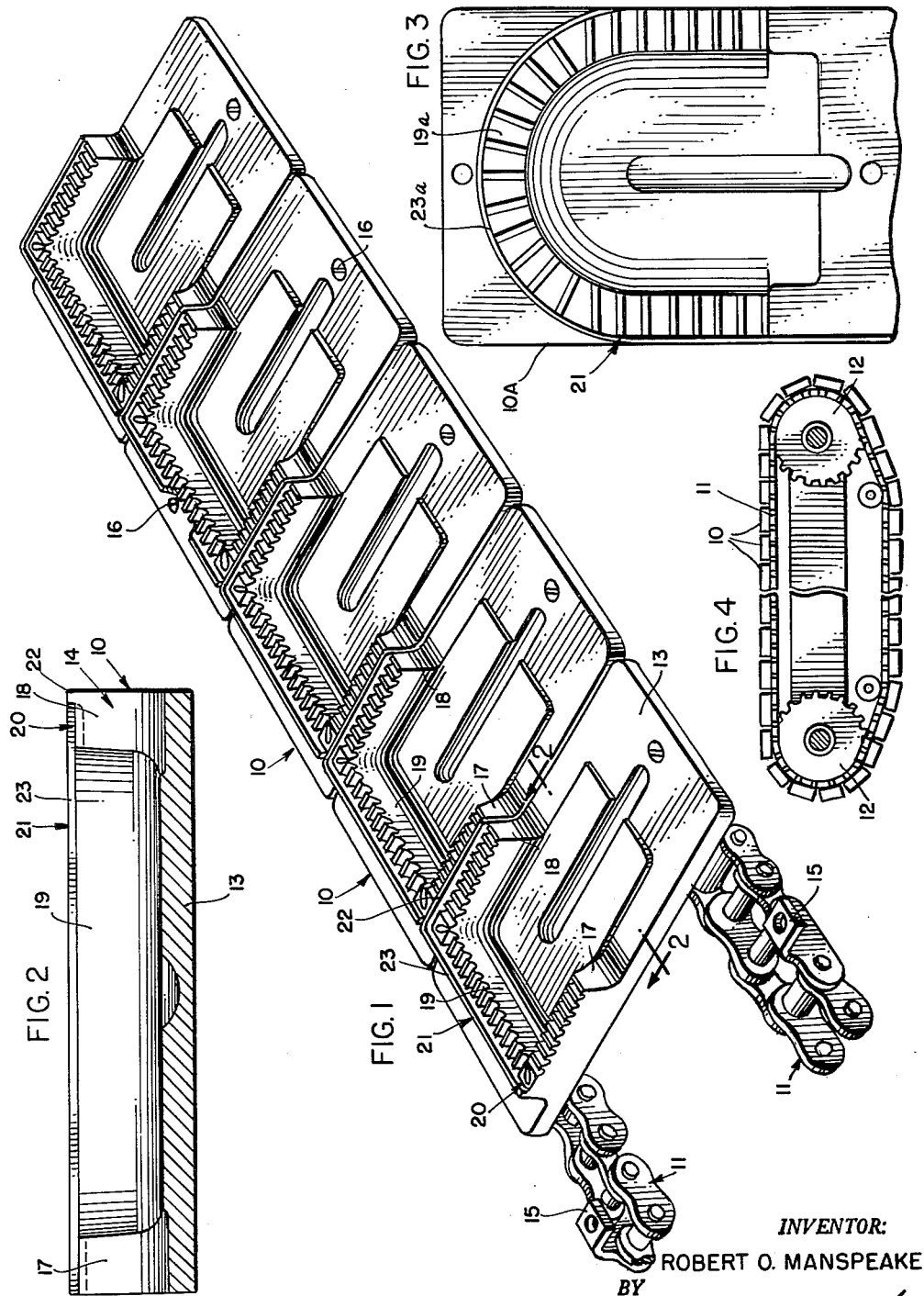

3,046,911
PIE MAKING MACHINE
Robert O. Manspeaker, 1120 McNeil St., Memphis, Tenn., assignor of one-half to Maurice F. Keathley, Sr., Memphis, Tenn.
Filed Jan. 18, 1960, Ser. No. 3,132
3 Claims. (Cl. 107—1)

This invention relates in general to a pie making machine and more particularly to pie molds adapted for use on a conveyor, although other uses and purposes may be apparent to one skilled in the art.

The use of the term "pie" in the present application includes all food stuffs baked, fried, or otherwise treated for edibility where made, at least in part, from dough. One form of pie making operation contemplated in connection with the present invention includes deposition of a layer of dough upon the mold, charging the dough with a filling in the mold area, and folding over the dough outside of the mold area to envelop the filling.

The pie mold of the present invention is adapted to be mounted in multiple side-by-side relation on an endless conveyor supporting member for mass production of pies. One problem always confronting pie manufacturers employing pie making machines heretofore developed is the excessive amount of scrap dough. Economic necessity requires re-use of all scrap dough, and it is common knowledge in the industry that crust made from scrap dough which has to be reworked is not of the same high quality as crust made from new dough. Further, reworking of scrap dough tends to increase the cost of making pies therefrom because of the added labor expense. Accordingly, it is an object of the present invention to provide a pie mold for a pie making machine which reduces the amount of scrap dough when producing a given number of pies.

A pie mold of the present invention includes a base plate defining a bottom, a U-shaped wall upstanding from the base plate and having parallel opposed side portions interconnected at corresponding ends by an end portion. The width of the wall is such as to provide an upper dough crimping surface. A dough cutting edge extends upwardly along the outer edge of the dough crimping surface and along one of the side portions and the end portion. The parallel opposed side portions are at the opposite extremities of opposed edges of the base plate, which opposed edges are in side-by-side relation with adjacent pie molds. Thus, the cutting edge along the side portion is common to an adjacent pie mold side portion which is not provided with a cutting edge. Hence, only a single cut in the dough is made between adjacent molds, thereby eliminating the production of scrap dough between molds as found in the Abel et al. Patent No. 2,588,454. Further, the pie mold construction of the present invention permits closer spacing of adjacent molds on a conveyor supporting member which reduces over-all space requirements and enables a higher speed operation for the pie making machine, thereby increasing pie production.

Another object of the present invention is to provide a pie mold construction for a pie making machine which reduces the amount of scrap dough produced, thereby giving an over-all higher quality product at a lower cost.

Still another object of this invention resides in the provision of a pie mold construction for a pie making machine wherein only a single dough cut need be made between adjacent pie molds.

A further object of this invention is in the provision of a pie mold construction for a pie making machine wherein over-all space requirements are reduced and a greater pie production can be realized.

Other objects, features, and advantages of the invention will be apparent from the following detailed disclosure, taken in conjunction with the accompanying sheet of drawing, wherein like reference numerals refer to like parts, in which:

FIG. 1 is a perspective view of a plurality of pie molds constructed in accordance with the present invention and shown mounted on a pair of endless conveyor chains;

FIG. 2 is an enlarged sectional view of a single pie mold, and taken substantially along line 2—2 of FIG. 1;

FIG. 3 is a top plan view, partially fragmentary, of a modified pie mold according to the present invention, and FIG. 4 is a generally diagrammatic view of an endless conveyor on a greatly reduced scale illustrating the manner of providing an endless line of pie molds according to the present invention.

Referring to the drawing and particularly to FIG. 1, a plurality of pie molds, generally designated by the numeral 10, are shown in side-by-side relation and mounted on an endless conveyor supporting member defined by a pair of parallel spaced endless chains 11. As seen in FIG. 4, the endless chains 11 are trained about longitudinally spaced sprockets 12. Thus, the endless chains, having a plurality of the pie molds 10 mounted thereon to form an endless line of molds, define a part of a pie making machine. Inasmuch as other parts of a pie making machine, such as rollers and the like, do not form a part of the present invention, they are not illustrated herein. It will be appreciated that other types of endless conveyor supporting members may be employed for mounting of the pie molds of the present invention.

Each pie mold 10 includes a base plate 13 defining a bottom, a U-shaped wall 14 upstanding from the base plate and at one end thereof. The base plate is rectangular, and as illustrated provided with a longitudinal dimension much greater than the transverse dimension. The longitudinal dimension of the base plate extends transversely of the conveyor path of movement, while the transverse dimension parallels the conveyor path of movement. It will be appreciated that the transverse dimension may in some cases be greater than the longitudinal dimension or may be equal thereto, depending upon the installation.

For purposes of illustrating a method of mounting the molds on the conveyor chains, aligned sets of tapped lugs 15 are carried by the conveyor chains 11 to receive bolts or screws 16 extending through aligned apertures on the base plate of each pie mold.

The U-shaped wall 14 includes parallel spaced leg or side portions 17, 18 interconnected at corresponding ends by a bight or end portion 19. In the embodiment of FIGS. 1 and 2, the bight portion 19 is straight and extends substantially perpendicular to the leg portions. The width of the wall is sufficient to provide an upper dough crimping surface 20. The dough crimping surface as illustrated is corrugated or serrated, although it will be appreciated that other surface configurations may be employed.

At the outer edge of the dough crimping surface 20 and extending upwardly therefrom along one leg portion and the bight portion is a dough cutting edge 21. The dough cutting edge 21 includes a side section 22, extending along the leg or side portion 18, and an end section 23, extending along the bight or end portion 19. Thus, there is no cutting edge section along the leg or side portion 17 of the wall, but the side section 22 of the cutting edge is common to the leg portion 18 of one mold and the leg portion 17 of the adjacent mold thereto. As seen in FIGS. 1 and 2, the outer sides of the opposed wall leg portions 17, 18 are coincident with the opposed corresponding edges of the base plate 13. It may also be noted that the sections 22 and 23 of the cutting edge 21 are at the outer very edges of the crimping surface along the leg portion 18 and the bight portion 19 of the wall 14. In practice, it has been found that spacing between adjacent pie molds of .05″ is satisfactory, and that this small space will not collect dough.

The U-shaped wall 14, in the embodiment herein illustrated, occupies less than half the top surface of the base plate 13 and is at one end thereof for the production of a fold-over type pie. In operation, a layer of dough would be deposited upon the molds, and a charge of filling would then be dispensed onto the layer of dough at the mold area defined by the wall 14. The width of the layer of dough would be such as to somewhat overlie the end sections 23 of the cutting edge and extend across the base plate 13 from the wall 14 so that it may be folded over the filling and slightly over the end sections 23 of the cutting edge. Rollers would be usually employed for pressing the dough against the cutting edges thereby trimming the excess overhanging the end sections 23 and separating the dough along the side sections 22. Thus, there is no scrap dough cut from the layer of dough between adjacently made pies in adjacent pie molds.

The pie molds 10 may be constructed in any suitable manner and preferably by a casting process. Any desirable type of metal may be cast or suitably formed to construct the pie molds.

Referring now to the modification of FIG. 3, the pie mold shown therein may be generally designated by the numeral 10A, and differs from the embodiment of FIGS. 1 and 2 only in that the bight or end portion 19a is arcuately formed. Similarly, the end section of the cutting edge, and designated herein by the numeral 23a, is arcuately formed.

It will be understood that modifications and variations may be effected without departing from the scope of the novel concepts of the present invention, but it is understood that this application is to be limited only by the scope of the appended claims.

The invention is hereby claimed as follows:

1. In a pie making machine, an endless supporting member, a plurality of substantially rectangular base plates secured adjacent to each other on said supporting member, a pie mold on each base plate comprising a continuous upstanding wall having an upper crimping surface, said wall comprising a pair of aligned parallel wall sections mounted along the opposite sides of each base plate in a contiguous relation to the respective leading and trailing sides of adjacent base plates and a connecting wall section joining one of the ends of one parallel wall section with the corresponding end of the other parallel wall section, said parallel wall sections extending from adjacent one end of each base plate into the medial portion thereof, thereby leaving about one-half of the base plate substantially flat to support part of the dough not held by the mold, and a cutting edge arranged along the outer periphery of the connecting wall section and one of the said parallel wall sections of each continuous upstanding wall so that the cutting edge along the parallel wall section is common to a pair of contiguous parallel wall sections.

2. In a pie making machine as defined by claim 1, wherein the connecting section extends perpendicular to said parallel sections.

3. In a pie making machine as defined by claim 1, wherein the connecting section is arcuate.

References Cited in the file of this patent

UNITED STATES PATENTS

| | | |
|---|---|---|
| 2,144,720 | Gibson | Jan. 24, 1939 |
| 2,386,993 | Valdastri | Oct. 16, 1945 |
| 2,588,454 | Abel et al. | Mar. 11, 1952 |
| 2,780,181 | Roman et al. | Feb. 5, 1957 |
| 2,855,867 | Zeitlin | Oct. 14, 1958 |